United States Patent [19]

Imamura

[11] 4,416,227

[45] Nov. 22, 1983

[54] HOSE JOINT WITH A SHELTERING COVER

[75] Inventor: Noriaki Imamura, Toyota, Japan

[73] Assignee: Toyota Jidosha Kogyo Kabushiki Kaisha, Aichi, Japan

[21] Appl. No.: 207,888

[22] Filed: Nov. 18, 1980

[30] Foreign Application Priority Data

Jul. 24, 1980 [JP] Japan .................................. 55-101579

[51] Int. Cl.³ .............................................. F02B 77/11
[52] U.S. Cl. ........................... 123/198 D; 123/195 C; 123/198 E; 285/45
[58] Field of Search ..................... 285/45, 46, 48, 286; 123/198 C, 198 E, 187, 425, 509, 41.31, 198 D, 195 C; D7/107; 417/373; 261/DIG. 81

[56] References Cited

U.S. PATENT DOCUMENTS

| 2,152,091 | 3/1939 | Rockwell | 123/41.31 |
| 2,253,717 | 8/1941 | McInnerney | 123/41.31 |
| 2,985,091 | 5/1961 | Hutcher | 285/45 X |
| 3,113,790 | 12/1963 | Mutthiessen | 285/45 |
| 3,769,954 | 11/1973 | Morgenroth | 123/198 E |

FOREIGN PATENT DOCUMENTS 222446  7/1962  Fed. Rep. of Germany ........ 285/45

Primary Examiner—Dave W. Arola
Attorney, Agent, or Firm—Parkhurst & Oliff

[57] ABSTRACT

A hose joint, used in the neighborhood of a radiant heat source such as an exhaust manifold in a vehicle for example, having on one end thereof a hose attaching portion and on the other end a fixing portion, provided with a sheltering cover secured on the hose joint in the middle between the hose attaching portion and the fixing portion for being interposed between the radiant heat source and the hose so as to protect the latter from the former's heat. The sheltering cover is a metallic plate which is metal-plated for effectively reflecting the radiant heat; it is preferably disposed perpendicularly to a line linking the hose attaching portion and the radiant heat source irrespective of the shape of the hose joint, for example, straight or bent.

8 Claims, 5 Drawing Figures

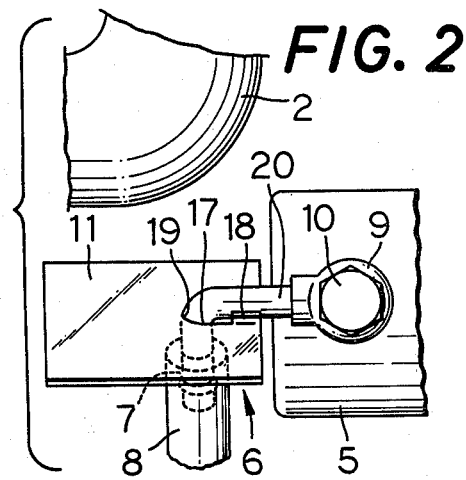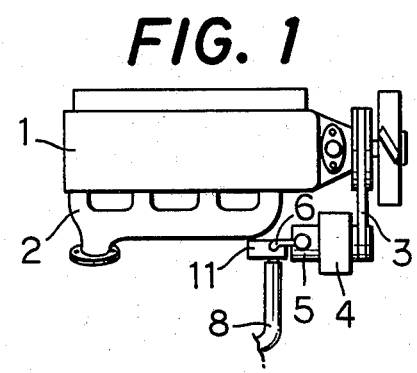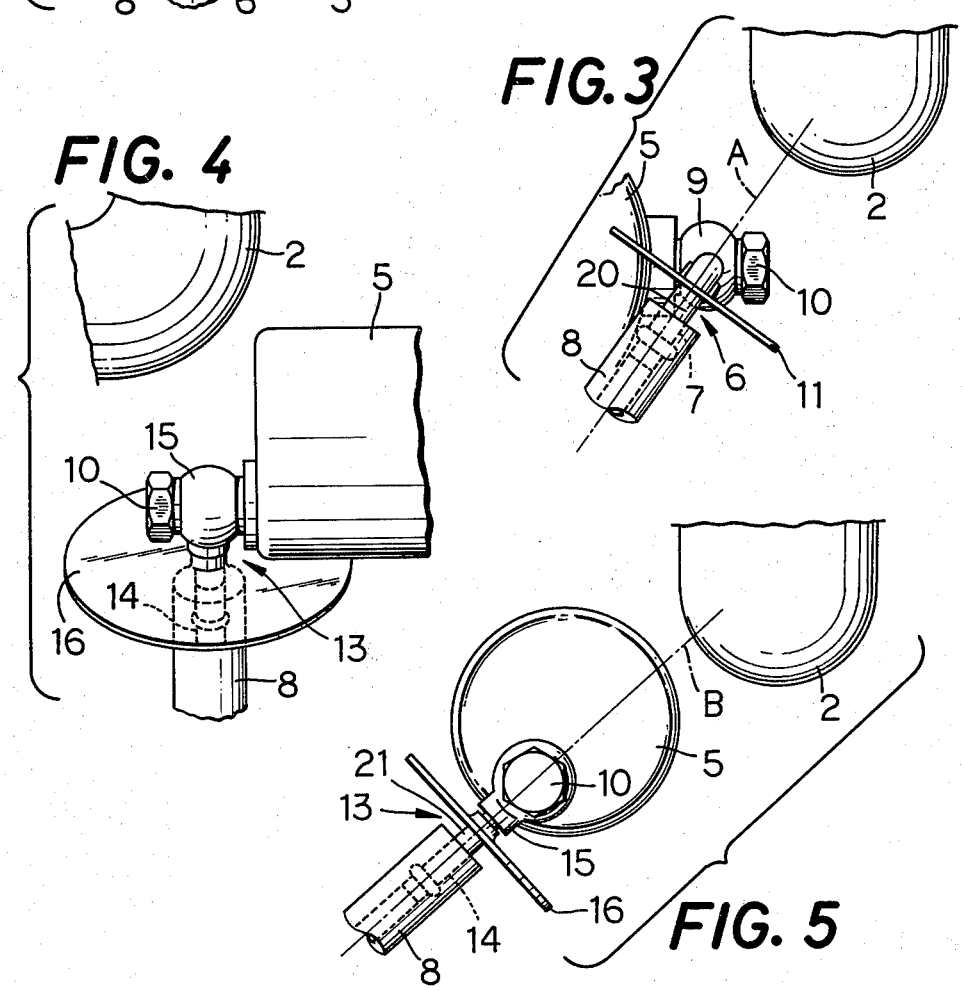

HOSE JOINT WITH A SHELTERING COVER

BACKGROUND OF THE INVENTION

This invention relates to structure of a hose joint for connecting a hose to a fluid apparatus such as a piping, pump, valve, etc. for preventing damage by radiant heat to the hose from a radiant heat source located in the neighborhood of the hose joint.

In most places for taking out fluid pressure with a hose from a fluid apparatus, a metallic hose joint, with one end being fixedly connected to the fluid apparatus and the other end being inserted into the hose, is usually utilized. The hose in such places is usually made of an organic elastic material such as synthetic rubber or the like, so it is liable to deteriorate when it is subjected to direct heat radiation from a radiant heat source in the neighborhood thereof. When the radiant heat source is an exhaust manifold and the hose joint is connected to a vacuum pump located in the vicinity of the exhaust manifold, for example in a vehicle, a hose for taking out negative pressure from the vacuum pump often deteriorates to become fragile or easily breakable. It may cause paralysis of a device or apparatus utilizing negative pressure, such as a brake booster, which will possibly lead to a grave accident.

Against such a problem the idea of isolating the hose from the exhaust manifold, a radiant heat source, by means of elongating the hose joint has been proposed. However, the idea is still problematical, because the hose joint is liable to become weak or susceptible to engine vibration and to make the space of the engine room even narrower. Another idea is employment of a heat-resisting hose. It remarkably raises the cost of the hose, perhaps doubling, still leaving a problem whether the temperature to which the hose is resistant is sufficient or not.

SUMMARY OF THE INVENTION

This invention was made from such a background. It is therefore a primary object of this invention to provide a compact and inexpensive hose joint capable of preventing deterioration of a hose connected thereto even when it is disposed in the neighborhood of a radiant heat source.

This invention is characterized in, for attaining this object, disposing a sheltering cover fixed in the middle part of a hose joint which is positioned in the neighborhood of a radiant heat source, having one end formed into a hose attaching portion and the other end formed into a fixing portion, in an interposed manner between a hose fitted on the hose attaching portion and the radiant heat source, so as to protect the hose from the radiant heat.

The sheltering cover may be a simple plate like member. It is however preferable that the cover is disposed in a directly opposed state as exactly as possible to the radiant heat source and that the cover is metal-plated on the opposing surface thereof so that it may reflect the radiant heat effectively. When this hose joint is connected to a vacuum pump located in the neighborhood of an exhaust manifold for taking out the negative pressure to a brake booster by a rubber hose, it will be highly effective in enhancing the reliability of the brake booster.

BRIEF DESCRIPTION OF THE DRAWINGS

FIG. 1 is a general view of the environment in which an embodiment of a hose joint according to this invention is put;

FIG. 2 is a plan view of an essential part of the hose joint in FIG. 1;

FIG. 3 is a side view of an essential part of the hose joint in FIG. 1;

FIG. 4 is a corresponding plan view to FIG. 2 of another embodiment of a hose joint according to this invention; and FIG. 5 is a corresponding side view to FIG. 3 of the hose joint in FIG. 4.

DETAILED DESCRIPTION OF THE PREFERRED EMBODIMENTS

With reference to the appended drawings, a detailed description of preferred embodiments will be made hereunder.

Numeral 1 designates an internal combustion engine. On one side of the engine an exhaust manifold 2, a piping for discharging exhaust gas, is disposed. In the vicinity of the exhaust manifold 2, an alternator 4 which is driven by a drive shaft of the engine 1 by way of a V-belt 3 and a vacuum pump 5, a kind of fluid apparatus, are installed. To the vacuum pump 5 a rubber hose 8 is connected by an L-shapd hose joint 6. The hose joint 6 is provided with, as shown in FIG. 2, a tubular portion 20 with a hose attaching portion 7 on one end thereof and a connecting portion 9 disposed on the other end of the tubular portion 20. The tubular portion 20 is provided with a bent portion by being bent at a place between the hose attaching portion 7 and the connecting portion 9. The connecting portion 9 is fixed on, and connected to, the vacuum pump 5 with a conventional connecting bolt 10 having a fluid passage therein. The hose 8 is fitted on the hose attaching portion 7.

On the bend portion of the hose joint 6 a zinc galvanized sheltering cover 11 is secured in a straddling posture. The sheltering cover 11 is of rectangular plate form with a notch 17 of U-shape and is engaged at the notch 17 with the bent portion and/or thereto neighboring places of the tubular portion 20. The sheltering cover 11 is provided with a pair of lugs 18 at the open end of the notch 17 and is secured by brazing or hard soldering to the tubular portion 20 at the lugs 18 and the closed end portion 19 of the notch 17. This way of fixing the cover 11 to the tubular portion by means of the notch 17 is largely effective in securing the same with sufficient strength against the vibration from the engine 1. The cover 11 is disposed perpendicularly to a line, marked A in FIG. 3, linking the exhaust manifold 2 the radiant heat source, and the hose attaching portion 7.

The exhaust manifold 2 is in a red heat state of approximately 700° C., while the engine is operating under a heavy load, radiating high radiant heat to the environment thereof. It is well known that the radiant heat amount given to an object under its influence is inversely proportional to the square of the distance thereto. So the hose 8 connected to the hose joint 6 disposed in the neighborhood of the exhaust manifold 2 is naturally subjected to a fairly large amount of radiant heat. However, the sheltering cover 11 interposed between the exhaust manifold 2 and the hose attaching portion 7 interrupts or intercepts the radiant heat from the exhaust manifold 2 from reaching the hose 8, and the tubular portion 20 itself prevents the radiant heat from coming to the hose 8 through the notch 7 by sheltering a vacant area formed by the notch 7. It effectively limits the rising of the temperature on the hose 8, preventing the same from being deteriorated by heat. In the conventional case where no cover 11 is used for intercepting the radiant heat the surface temperature of the hose 8 reaches 158° C. while in the invented hose joint 6 with the cover 11, the surface temperature of the hose 8 is as low as 98° C. which is far lower than the usual resistable temperature of 120° C. for the hose 8. In this instance the zinc galvanized surface of the cover 11 functions to reflect the radiant heat. And when the vacuum pump 5 to which the hose joint 6 is fixedly connected is in high temperature the cover plate 11 functions as a cooling fin. And the posture of the cover 11 directly opposing the exhaust manifold 2 is the best for getting the largest effective surface of heat intercepting.

Another embodiment of this invention will be described hereunder.

In FIGS. 4-5, a hose joint 13 of straight form consists of a tubular member 21 which is on one end thereof formed into a hose attaching portion 14 for being fitted by a hose 8 and a connecting member 15 which is secured on the other end of the tubular member 21 for being fixedly connected with the connecting bolt 10 to the suction port of the vacuum pump 5. A zinc galvanized sheltering cover 16 of circular plate form having a through hole in the center thereof and an annular flange formed around the through hole by burring is brazed onto the middle of the tubular member 21 in a pierced manner. The cover 16 is disposed perpendicularly to a line B in FIG. 5 linking the exhaust manifold 2 and the hose attaching portion 14. This type cover 16 is similarly effective in intercepting the radiant heat to protect the hose 8 from being deteriorated by heat. The cover 16 is preferably fitted on the tubular member 21 before the connecting member 15 is attached to the tubular member 21, and the brazing of the cover 16 and the connecting member 15 to the tubular member 21 may be carried out at the same time.

The above-mentioned are all for describing embodiments of this invention by way of examples. This invention should be interpreted by no means to be limited to those embodiments.

The sheltering cover 11, 16 may be, for example, polygonal shape or the like, so long as it is effective in intercepting the radiant heat linearly coming to the hose 8, to be more exact to the fitted portion of the hose 8 onto the hose joint. The shape and the surface angle when attaching may be varied in various ways.

The brazing of the cover 11, 16 to the hose joint 6, 13 may, for instance, be changed to welding, when it is fixed.

Although the surface of the cover 11, 16 is preferred to be metal-plated by electroplating or fusion-plating so as to be reflective of the radiant heat, the surface treatment may be made with other material or materials.

What is claimed is:

1. A hose joint, adapted to connect a hose to a fluid apparatus disposed in the vicinity of a radiant heat source, comprising:
   a tubular portion including a hose attaching portion at one end thereof having a hose fitted thereon, and further including a bent portion bent between said hose attaching portion and another end of the tubular portion;
   a connecting portion disposed at said other end of said tubular portion for being connected to a fluid apparatus; and
   a plate-like sheltering cover having a U-shape notch therein and secured to said tubular portion between said hose attaching portion and said connecting portion such that the sheltering cover is interposed between the radiant heat source and said hose so as to intercept and disperse radiant heat from the radiant heat source away from said hose, said U-shape notch of the sheltering cover engaging said tubular portion in the neighborhood of said bent portion, said tubular portion sheltering an area formed by said U-shape notch and thereby preventing the radiant heat from reaching said hose through said U-shape notch.

2. A hose joint according to claim 1, wherein said sheltering cover is provided with a pair of lugs erected therefrom at the open end of said notch and is brazed to said tubular portion at least at said lugs and a closed end of said notch.

3. A hose joint according to claim 1, wherein said sheltering cover is metal-plated on the surface thereof for reflecting radiant heat from the radiant heat source.

4. A hose joint according to claim 1, wherein said sheltering cover is disposed substantially perpendicular to a line linking said hose and the radiant heat source.

5. A hose joint for connecting a rubber hose to a vacuum pump disposed in the vicinity of an exhaust manifold of an internal combustion engine, comprising:
   a tubular portion including a hose attaching portion at one end thereof having a rubber hose fitted thereon, and further including a bent portion bent between said hose attaching portion and another end of the tubular portion;
   a connecting portion disposed at said other end of said tubular portion being connected to a vacuum pump; and
   a plate-like sheltering cover having a U-shape notch therein and secured to said tubular portion between said hose attaching portion and said connecting portion such that the sheltering cover is interposed between the exhaust manifold and said rubber hose so as to intercept and disperse radiant heat, which emanates from the exhaust manifold, away from said rubber hose, said U-shape notch of the sheltering cover engaging said tubular portion in the neighborhood of said bent portion, said tubular portion sheltering a vacant area formed by said U-shape notch and thereby preventing the radiant heat from reaching said rubber hose through said U-shape notch.

6. A hose joint according to claim 5, wherein said sheltering cover is provided with a pair of lugs erected therefrom at an open end of said U-shape notch, said sheltering cover being brazed to said tubular portion at least at said lugs and at a closed end of said U-shape notch.

7. A hose joint according to claim 5, wherein said sheltering cover is metal-plated on the surface thereof for reflecting radiant heat from the radiant heat source.

8. A hose joint according to claim 5, wherein said sheltering cover is disposed substantially perpendicularly to a line linking said rubber hose and the exhaust manifold.

* * * * *